US012585466B2

(12) United States Patent
Yao et al.

(10) Patent No.: US 12,585,466 B2
(45) Date of Patent: Mar. 24, 2026

(54) IN-MEMORY COMPUTING PROCESSOR, PROCESSING SYSTEM, PROCESSING APPARATUS, DEPLOYMENT METHOD OF ALGORITHM MODEL

(71) Applicant: TSINGHUA UNIVERSITY, Beijing (CN)

(72) Inventors: Peng Yao, Beijing (CN); Bin Gao, Beijing (CN); Dabin Wu, Beijing (CN); Hu He, Beijing (CN); Jianshi Tang, Beijing (CN); He Qian, Beijing (CN); Huaqiang Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 378 days.

(21) Appl. No.: 17/780,327

(22) PCT Filed: Nov. 5, 2021

(86) PCT No.: PCT/CN2021/128957
§ 371 (c)(1),
(2) Date: May 26, 2022

(87) PCT Pub. No.: WO2022/183759
PCT Pub. Date: Sep. 9, 2022

(65) Prior Publication Data
US 2023/0168891 A1 Jun. 1, 2023

(30) Foreign Application Priority Data
Mar. 2, 2021 (CN) .......................... 202110231930.8

(51) Int. Cl.
*G06F 15/78* (2006.01)
*G06F 9/30* (2018.01)
(Continued)

(52) U.S. Cl.
CPC .......... *G06F 9/3004* (2013.01); *G06F 9/3877* (2013.01); *G06F 9/4881* (2013.01); *G06F 15/7821* (2013.01)

(58) Field of Classification Search
CPC .......................... G06F 9/4881; G06F 15/7821
See application file for complete search history.

(56) References Cited

U.S. PATENT DOCUMENTS

2019/0065111 A1* 2/2019 Lea ........................ G06F 3/0604
2019/0221261 A1* 7/2019 Ge ......................... H10B 63/30
(Continued)

FOREIGN PATENT DOCUMENTS

CN 109542391 A 3/2019
CN 112149816 A 12/2020
CN 112836814 A 5/2021

*Primary Examiner* — Jacob Petranek
(74) *Attorney, Agent, or Firm* — Scully, Scott, Murphy & Presser, P.C.

(57) ABSTRACT

An in-memory computing processor, an in-memory computing processing system, an in-memory computing processing apparatus, and a deployment method of an algorithm model based on the in-memory computing processor are disclosed. The in-memory computing processor includes a first master control unit and a plurality of memristor processing modules, and the first master control unit is configured to be capable of dispatching and controlling the plurality of memristor processing modules, the plurality of memristor processing modules are configured to be capable of calculating under the dispatch and control of the first master control unit, and the plurality of memristor processing modules are further configured to be capable of communicating independently of the first master control unit to calculate.

16 Claims, 9 Drawing Sheets

(51) Int. Cl.
    *G06F 9/38*          (2018.01)
    *G06F 9/48*          (2006.01)

(56) References Cited

U.S. PATENT DOCUMENTS

| | | | |
|---|---|---|---|
| 2021/0224185 A1* | 7/2021 | Zhou | G06F 9/5016 |
| 2021/0240945 A1* | 8/2021 | Strachan | G11C 11/41 |
| 2022/0012303 A1* | 1/2022 | Zheng | G06F 17/16 |
| 2022/0189531 A1* | 6/2022 | Yudanov | H03K 19/01742 |

* cited by examiner

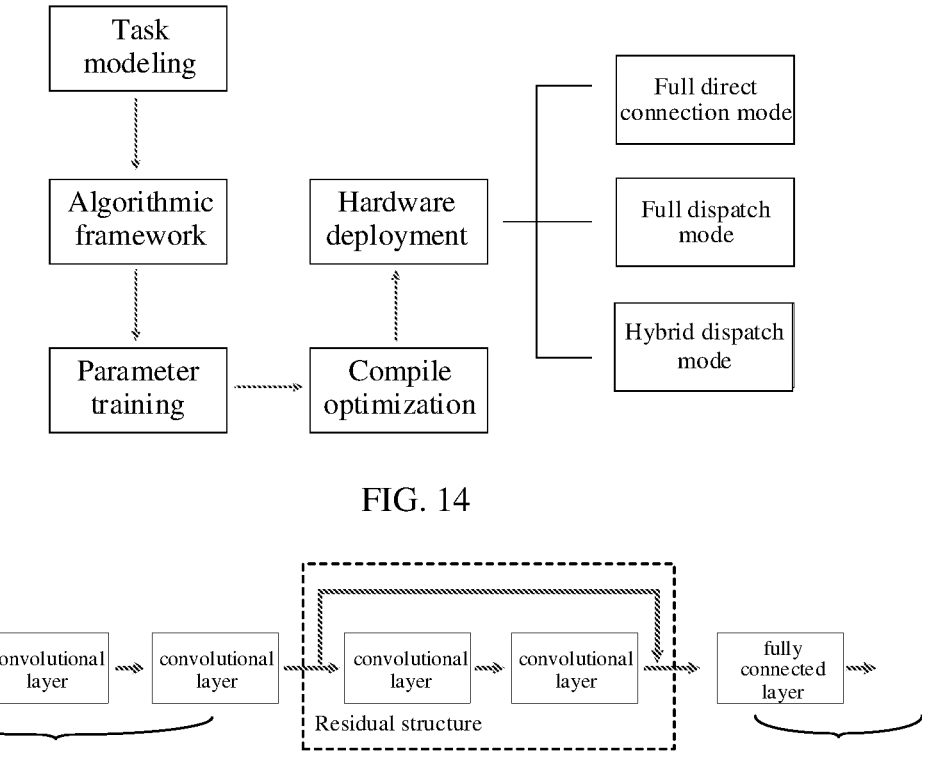
FIG. 14
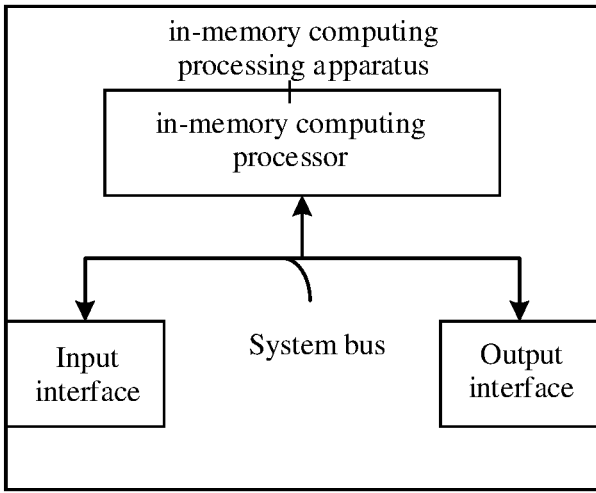
Direct connection mode          dispatch   mode          Direct connection mode
FIG. 15
FIG. 16

IN-MEMORY COMPUTING PROCESSOR, PROCESSING SYSTEM, PROCESSING APPARATUS, DEPLOYMENT METHOD OF ALGORITHM MODEL

CROSS-REFERENCE TO RELATED APPLICATIONS

This application is a national phase entry of PCT International Application No. PCT/CN2021/128957, filed on Nov. 5, 2021, which claims priority to Chinese Patent Application No. 202110231930.8 filed on Mar. 2, 2021. The disclosure of PCT International Application No. PCT/CN2021/128957 and Chinese Patent Application No. 202110231930.8 are incorporated by reference herein.

TECHNICAL FIELD

Embodiments of the present disclosure relate to an in-memory computing processor, an in-memory computing processing system, an in-memory computing processing apparatus, and a deployment method of an algorithm model based on the in-memory computing processor.

BACKGROUND

The information era has shown a new trend of intelligence, and the main problem it faces is the contradiction between the explosive growth of data, model scale and the limited computing power. Because of the gradual stagnation of the development of Moore's Law and the defects of the intrinsic architecture of the separation of storage and computation in traditional computing system, classical computing chips may not meet the high computing power and high energy efficiency requirements of artificial intelligence development. The in-memory computing technology based on the memristor is expected to achieve subversive breakthroughs. Relying on the advantages of new devices and the paradigm of in-memory computing, the computing process does not require data migration, which reduces the latency of accessing storage and energy consumption, and is expected to achieve a huge increase in computing power and energy efficiency.

After years of development, the development of memristor-based in-memory computing technology based on the memristor has been focused on research related to the implementation of the memristor-based in-memory computing chip and system after the device optimization and array function demonstration stages. At present, the implementation of memristor chips is mainly a macro-array chip with a simple structure (integrated memristor array and a simple peripheral circuit structure) and a highly customized dedicated chip for specific networks and specific applications, lacking efficient and general-purpose memristor-based in-memory computing architecture and chip. The memristor-based in-memory computing architecture or chip with a general-purpose refers to the ability to deploy and run various deep neural network architectures, suitable for different application tasks and application scenarios, and needs to be flexible and efficient at the same time. How to balance flexibility, efficiency and versatility is the difficulty of the memristor-based in-memory computing chip design.

SUMMARY

At least some embodiments of the present disclosure provide an in-memory computing processor, comprising: a first master control unit and a plurality of memristor processing modules, wherein the first master control unit is configured to be capable of dispatching and controlling the plurality of memristor processing modules; the plurality of memristor processing modules are configured to be capable of calculating under the dispatch and control of the first master control unit; and the plurality of memristor processing modules are further configured to be capable of communicating independently of the first master control unit to calculate.

For example, in the in-memory computing processor provided by at least some embodiments of the present disclosure, each of the plurality of memristor processing modules comprises a plurality of memristor processing units, wherein the first master control unit is further configured to be capable of dispatching and controlling the plurality of memristor processing units; the plurality of memristor processing units are configured to be capable of calculating under the dispatch and control of the first master control unit; and the plurality of memristor processing units are further configured to directly perform data communication to calculate.

For example, in the in-memory computing processor provided by at least some embodiments of the present disclosure, each of the plurality of memristor processing modules comprises a second master control unit and a plurality of memristor processing units, wherein the second master control unit is configured to be capable of dispatching and controlling the plurality of memristor processing units; the plurality of memristor processing units are configured to be capable of calculating under the dispatch and control of the second master control unit; and the plurality of memristor processing units are further configured to directly perform data communication to calculate.

For example, in the in-memory computing processor provided by at least some embodiments of the present disclosure, each of the plurality of memristor processing units has an independent interface address.

For example, in the in-memory computing processor provided by at least some embodiments of the present disclosure, each of the plurality of memristor processing units comprises a memristor array.

For example, in the in-memory computing processor provided by at least some embodiments of the present disclosure, the plurality of memristor processing modules communicate with each other via a bus or an on-chip routing.

For example, in the in-memory computing processor provided by at least some embodiments of the present disclosure, the first master control unit interacts with the plurality of memristor processing modules via a bus or an on-chip routing.

For example, in the in-memory computing processor provided by at least some embodiments of the present disclosure, each of the plurality of memristor processing modules has an independent interface address.

For example, the in-memory computing processor provided by at least some embodiments of the present disclosure further comprise a routing module and an input-output module, wherein the in-memory computing processor is configured to support a first computing mode, in the first computing mode, the routing module is configured to receive input data, parse the input data to obtain an input signal, and transmit the input signal to the input-output module, the input-output module is configured to distribute and transmit the input signal to at least one memristor processing module of the plurality of memristor processing modules, the at least one memristor processing module is configured to calculate according to the input signal to obtain an output signal, the input-output module is further configured to receive and collate the output signal from the at least one memristor processing module to obtain output data, and the routing module is further configured to output the output data.

For example, the in-memory computing processor provided by at least some embodiments of the present disclosure further comprise a routing module and an input-output module, wherein the in-memory computing processor is configured to support a second computing mode, in the second computing mode, the routing module is configured to receive input data, parse the input data to obtain an input signal, and transmit the input signal to the input-output module, the input-output module is configured to distribute and transmit the input signal to the first master control unit, the first master control unit is configured to store the input signal, and control at least one memristor processing module of the plurality of memristor processing modules to obtain the input signal for calculating, the at least one memristor processing module is configured to, under the control of the first master control unit, obtain the input signal and calculate according to the input signal to obtain an output signal, the first master control unit is further configured to store the output signal and transmit the output signal to the input-output module, the input-output module is further configured to receive and collate the output signal to obtain output data, the routing module is further configured to output the output data For example, the in-memory computing processor provided by at least some embodiments of the present disclosure further comprise a routing module and an input-output module, wherein the in-memory computing processor is configured to support a third computing mode, in the third computing mode, the routing module is configured to receive input data, parse the input data to obtain an input signal, and transmit the input signal to the input-output module, the input-output module is configured to distribute the input signal, transmit a first part of the input signal to a first part of the memristor processing modules among the plurality of memristor processing modules, and transmit a second part of the input signal to the first master control unit, the first part of the memristor processing modules is configured to calculate based on the first part of the input signal to obtain a first output signal, the first master control unit is configured to store the second part of the input signal, control a second part of the memristor processing modules among the plurality of memristor processing modules to obtain the second part of the input signal for calculating, the second part of the memristor processing modules is configured to, under the control of the first master control unit, obtain the second part of the input signal and calculate based on the second part of the input signal to obtain a second output signal, the first master control unit is further configured to store the second output signal, and transmit the second output signal to the input-output module, the input-output module is further configured to receive the first output signal and the second output signal, and correspondingly collate the first output signal and the second output signal to obtain the first output data and the second output data, the routing module is further configured to output the first output data and the second output data.

For example, at least some embodiments of the present disclosure provide an in-memory computing processing system, comprising a third master control unit and a plurality of in-memory computing processors according to any embodiment provided by the present disclosure, wherein the third master control unit is configured to be capable of dispatching and controlling the plurality of in-memory computing processors; the plurality of in-memory computing processors are configured to be capable of calculating under the dispatch and control of the third master control unit; the plurality of in-memory computing processors are further configured to be capable of communicating independently of the third master control unit to calculate.

For example, at least some embodiments of the present disclosure provide an in-memory computing processing apparatus, comprising: the in-memory computing processor according to any embodiment provided by the present disclosure, an input interface, and an output interface connected to the in-memory computing processor; wherein the input interface is configured to receive an instruction to control an operation of the in-memory computing processor, the output interface is configured to output an operation result of the in-memory computing processor.

For example, at least some embodiments of the present disclosure provide a deployment method of an algorithm model based on the in-memory computing processor according to any embodiment provided by the present disclosure, comprises: according to a characteristic of the algorithm model, in the in-memory computing processor, deploying the algorithm model in any one mode selected from a group consisting of a full direct connection mode, a full dispatch mode and a hybrid dispatch mode; wherein in the full direct connection mode, the plurality of memristor processing modules for implementing the algorithm model communicate independently of the first master control unit to calculate, in the full dispatch mode, the plurality of memristor processing modules for implementing the algorithm model perform calculation under the dispatch and control of the first master control unit, in the hybrid dispatch mode, a part of the memristor processing modules among the plurality of memristor processing modules for implementing the algorithm model communicates independently of the first master control unit to calculate, and another part of the memristor processing modules among the plurality of memristor processing modules for implementing the algorithm model performs calculation under the dispatch and control of the first master control unit.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

FIG. 14 is a schematic flowchart of a deployment method of an algorithm model provided by some embodiments of the present disclosure;

FIG. 15 is a schematic diagram of a deployment scheme for a residual neural network provided by some embodiments of the present disclosure; and FIG. 16 is a schematic block diagram of an in-memory computing apparatus provided by some embodiments of the present disclosure.

DETAILED DESCRIPTION

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A memristor (resistive memory, phase change memory, conductive bridge memory, etc.) is a non-volatile device whose conductive state may be adjusted by applying an external stimulus. According to Kirchhoff's current law and Ohm's law, an array composed of such devices may perform multiply-accumulate computation in parallel, and both storage and computation occur in each device of the array. Based on this computing architecture, it is possible to achieve an in-memory computing that does not require a large amount of data transfer. At the same time, multiply-accumulate is the core computing task required to run a neural network. Therefore, it is possible to achieve energy-efficient neural network computation based on this in-memory computing technology by using the conductance of the memristor-type devices in the array to represent the weight values.

Figure 1:
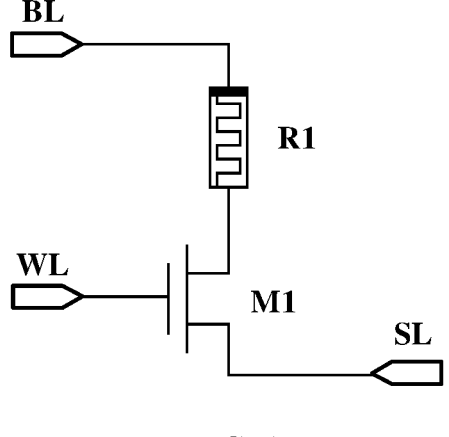
FIG. 1 is a schematic diagram of a memristor unit circuit.

FIG. 1 is a schematic diagram of a memristor unit circuit. As shown in FIG. 1, the memristor unit circuit has a 1T1R structure, i.e., the memristor unit circuit includes a transistor M1 and a memristor R1.

It should be noted that the transistors employed in the embodiments of the present disclosure may all be thin-film transistors or field-effect transistors (e.g., MOS field-effect transistors) or other switching devices with the same characteristics. The source and drain of the transistor employed herein may be symmetrical in structure, so that the source and drain of the transistor may be indistinguishable in structure. In the embodiments of the present disclosure, in order to distinguish the two electrodes of the transistor other than the gate electrode, one of the electrodes is directly described as the first electrode and the other as the second electrode.

Embodiments of the present disclosure do not limit the type of transistors used. For example, when the transistor M1 is an N-type transistor, the gate electrode of the transistor M1 is connected to a word line terminal WL, for example, the transistor M1 is turned on when the word line terminal WL inputs a high level; the first electrode of transistor M1 may be a source electrode and is configured to be connected to a source line terminal SL, for example, the transistor M1 may receive a reset voltage through the source line terminal SL; the second electrode of the transistor M1 may be a drain electrode and configured to be connected to the second electrode (e.g. negative electrode) of the memristor R1, and the first electrode (e.g. positive electrode) of the memristor R1 is connected to a bit line terminal BL, e.g. the memristor R1 may receive the setting voltage through the bit line terminal BL. For example, when the transistor M1 is a P-type transistor, the gate electrode of the transistor M1 is connected to the word terminal WL, for example, the transistor M1 is turned on when the word terminal WL inputs a low level; the first electrode of transistor M1 may be a drain electrode and configured to be connected to the source terminal SL, for example, the transistor M1 may receive a reset voltage through the source terminal SL; the second electrode of the transistor M1 may be a source electrode and configured to be connected to the second electrode of memristor R1 (e.g., negative electrode), and the first electrode of the memristor R1 (e.g., positive electrode) is connected to the bit line terminal BL, for example, the memristor R1 may receive a setting voltage through the bit line terminal BL. It should be noted that the structure of the memristor may also be implemented as other structures, such as a structure in which the second electrode of the memristor R1 is connected to the source line terminal SL, and the embodiments of the present disclosure do not limit this. Each of the following embodiments is illustrated by taking an N-type transistor as an example for the transistor M1.

The function of the word terminal WL is to apply a corresponding voltage to the gate electrode of the transistor M1, so as to control the transistor M1 to be turned on or off. When operating the memristor R1, for example, performing a set operation or a reset operation on the memristor R1, it is necessary to turn on the transistor M1 first, that is, it is necessary to apply a conduction voltage to the gate electrode of the transistor M1 through the word line terminal WL. After the transistor M1 is turned on, for example, the resistance state of the memristor R1 may be changed by applying a voltage to the memristor R1 through the source line terminal SL and the bit line terminal BL. For example, a setting voltage may be applied through the bit line terminal BL to make the memristor R1 in a low resistance state, and for example, a reset voltage may be applied through the source line terminal SL to make the memristor R1 in a high resistance state.

It should be noted that in the embodiments of the present disclosure, by applying a voltage at the word line terminal WL and the bit line terminal BL at the same time, the resistance value of the memristor R1 becomes smaller and smaller, that is, the memristor R1 changes from a high resistance state to a low resistance state, the operation of changing the resistance state from a high resistance state to a low resistance state is called the setting operation. By applying a voltage at the word line terminal WL and the source line terminal SL at the same time, the resistance value of the memristor R1 becomes greater and greater, that is, the memristor R1 changes from a low resistance state to a high resistance state, the operation of changing the resistance state from a low resistance state to a high resistance state is called the reset operation. For example, memristor R1 has a threshold voltage, and when the amplitude of the input voltage is less than the threshold voltage of memristor R1, the resistance value (or conductance value) of memristor R1 cannot be changed. In this case, the calculation may be performed by using the resistance value (or conductance value) of the memristor R1 by inputting a voltage less than the threshold voltage, and the resistance value (or conductance value) of the memristor R1 may be changed by inputting a voltage greater than the threshold voltage.

Figure 2:
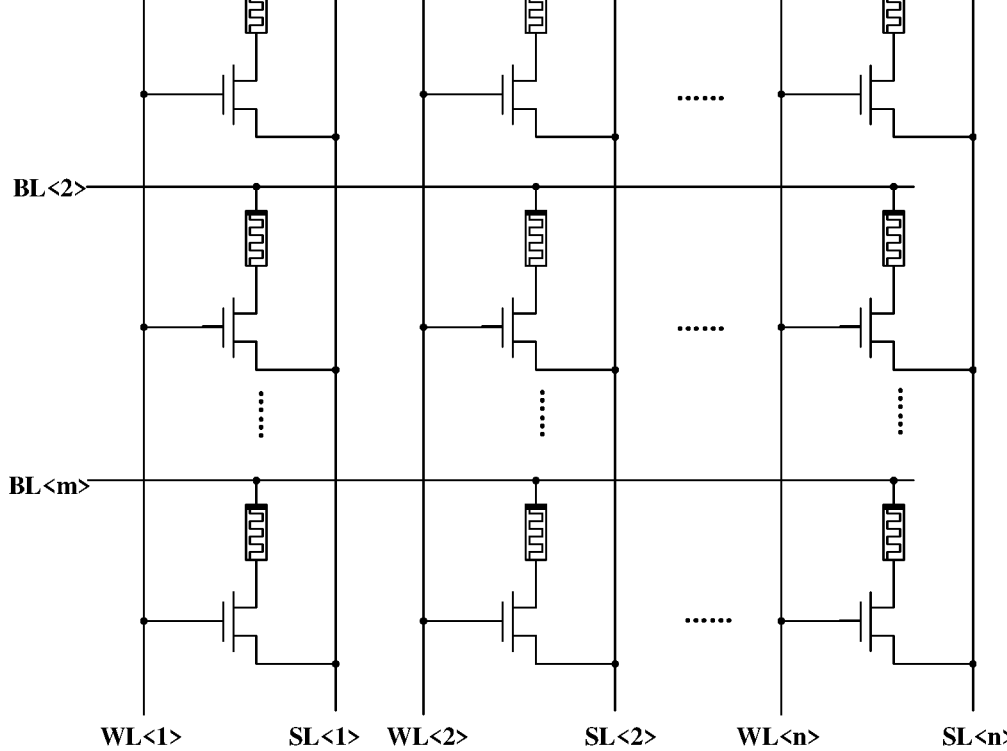
FIG. 2 is a schematic diagram of a memristor array.

FIG. 2 shows a memristor array. The memristor array is composed of a plurality of memristor unit circuits as shown in FIG. 1, for example, the plurality of memristor unit circuits form an array of m rows and n columns, and m is an integer greater than 1 and n is an integer greater than or equal to 1. BL<1> and BL<2> . . . BL<m> in FIG. 2 indicate the bit line of the first row, the bit line of the second row, . . . , the bit line of the m-th row, respectively, and the memristors in the memristor unit circuits of each row are connected to the corresponding bit lines of the row. WL<1> and WL<2 . . . WL<n> in FIG. 2 indicate the word line of the first column, the word line of the second column, . . . , the word line of the n-th column, respectively, and the gate electrodes of the transistors in the memristor unit circuits of each column are connected to the corresponding word lines of the column. SL<1> and SL<2> . . . SL<n> in FIG. 2 indicate the source line of the first column, the source line of the second column, . . . , the source line of the n-th column, respectively, and source electrodes of the transistors in the memristor unit circuits of each column are connected to the corresponding source lines of the column.

The memristor array with m rows and n columns shown in FIG. 2 may represent a neural network weight matrix with a size of m rows and n columns. For example, the first neuron layer has m neuron nodes which are correspondingly connected with m rows of bit lines of the memristor array shown in FIG. 2; the second neuron layer has n neuron nodes which are correspondingly connected to the n columns of source lines of the memristor array shown in FIG. 2. By inputting voltage excitation in parallel to the first neuron layer, the output current obtained by multiplying the voltage excitation vector and the conductance matrix of the memristor array (conductance is the inverse of resistance) may be obtained in the second neuron layer.

Specifically, according to Kirchhoff s law, the output current of the memristor array may be derived from the following equation:

$$i_j = \Sigma_{k=1}^{m}(v_k g_{k,j})$$

where j=1, . . . , n and k=1, . . . , m.

In the above equation, $v_k$ represents the voltage excitation at the input of neuron node k in the first neuron layer, $i_j$ represents the output current at neuron node j in the second neuron layer, and $g_{k,j}$ represents the conductance matrix of the memristor array.

It should be noted that, for example, in some examples, each weight of the neural network weight matrix may also be implemented by using two memristors. That is, the output of one column of output current may be implemented by two columns of memristors in the memristor array. In this case, representing a neural network weight matrix of m rows and n columns requires a memristor array with m rows and 2n columns.

It should be noted that the current output from the memristor array is an analog current. In some examples, the analog current may be converted to a digital voltage by an analog-to-digital conversion circuit (ADC), and the digital voltage may be transmitted to the second neuron layer, so that the second neuron layer may also convert the digital voltage into an analog voltage by a digital-to-analog conversion circuit (DAC), and the second neuron layer may be connected to another neuron layer by another memristor array; in other examples, the analog current may also be converted into an analog voltage and transmitted to the second neuron layer through the sample-and-hold circuit.

According to the Kirchhoff's law, the memristor array may complete the matrix-vector multiplication calculation in parallel. Matrix-vector multiplication calculation is the core and most basic operator unit in machine learning algorithms such as deep learning. The matrix-vector multiplication calculation may be accelerated by building a Processing Element (PE) of the memristor by using a memristor array to meet the needs of various intelligent application scenarios.

Figure 3:
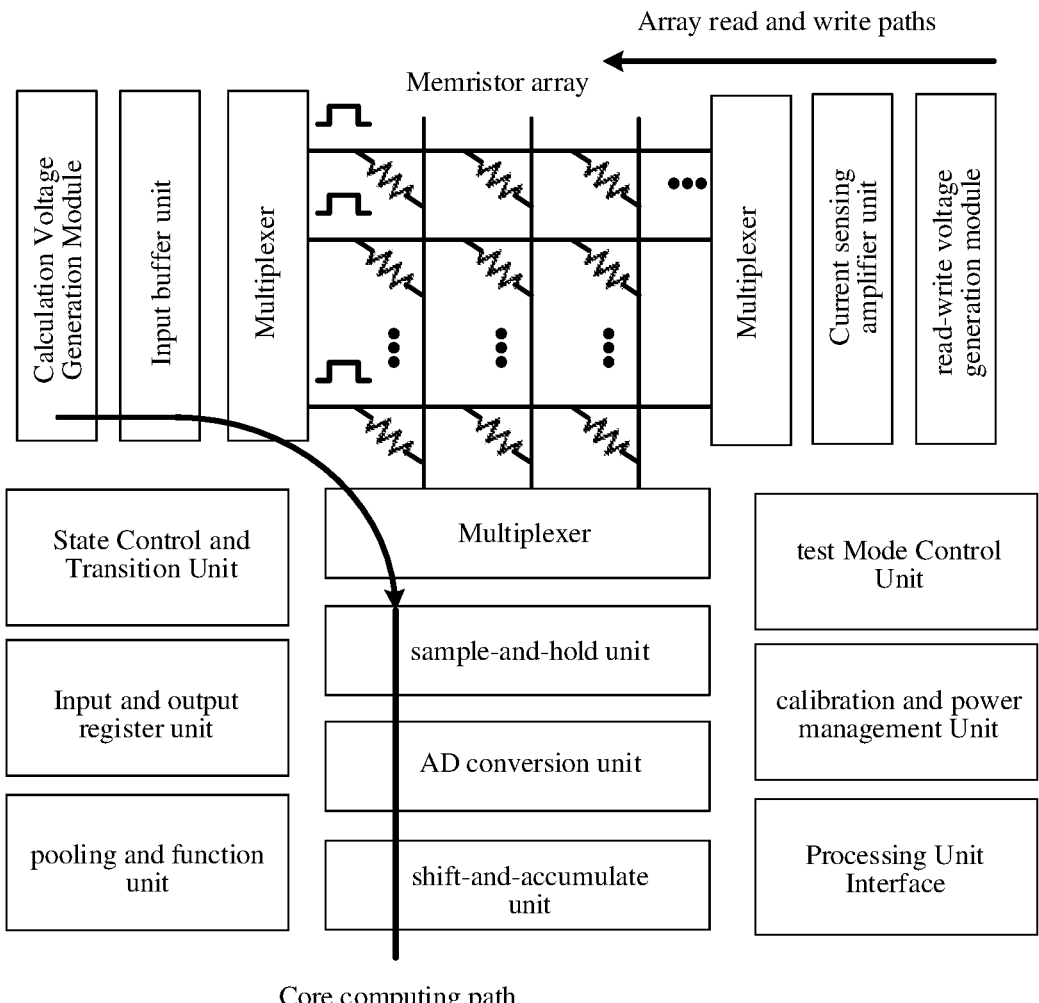
FIG. 3 is a schematic structural diagram of a memristor processing unit.

FIG. 3 is a schematic structural diagram of a memristor processing unit. The memristor processing unit includes a memristor array, a unit module that supports reading and writing programming of the memristor array, and a unit module that implements the core matrix-vector multiplication calculation. It should be noted that each unit module may be implemented by a circuit, and embodiments of the present disclosure do not limit the specific circuit implementation. For example, the calculation voltage generation module typically consists of an analog-to-digital conversion circuit that may provide a specific calculation voltage according to an external configuration; an input buffer unit is used to increase the driving capability of the memristor processing unit without changing the calculation voltage; a multiplexer selects the corresponding driven calculation voltage to access the memristor array according to the control of an external digital signal; a read-write voltage generation module is used to generate the voltage required for programming the memristor array, and the voltage includes the voltage for changing the resistance and the voltage for reading out the resistance; a current sense amplification unit is used to quantify the input analog current value which is usually used to read out the resistance value of a single memristor; a sample-and-hold unit is used to sample and hold the output current value of the memristor array in the calculation mode; an AD (analog-to-digital) conversion unit is used to quantify the saved analog current value into a digital value; a shift-and-accumulate module is used to accumulate the plurality of quantized values to generate the final calculation result; a state control and conversion unit is used for the control of the whole module, and generates the control signals of the module according to the input and current state; the input and output register unit is used to store the input-output signals; a pooling and function unit is used to realize the further processing of the calculation result through the digital circuit to complete the functional requirements of the neural network; a test mode control unit is used for the control of the test state of each circuit of the module; a calibration and power management unit is used for the calibration control of a specific circuit, and generates and drives the power supply of the whole module; the processing unit interface is the circuit for the communication between the whole module and the outside, and completes the signal transmission according to the designed protocol. After programming each device in the array to the target conductance through the array read/write path, the acceleration of artificial intelligence algorithms such as deep learning may be implemented through the core computing path. It should be understood that the structure of the memristor processing unit shown in FIG. 3 may be cut and added according to different architectures and application scenarios, such as adding an on-chip memory module, a direct memory access module, etc., which is not limited in the embodiments of the present disclosure.

The in-memory computing chip and system need to have both versatility and high efficiency. There are two main types of computing architectures in current in-memory computing processor.

Figure 4:
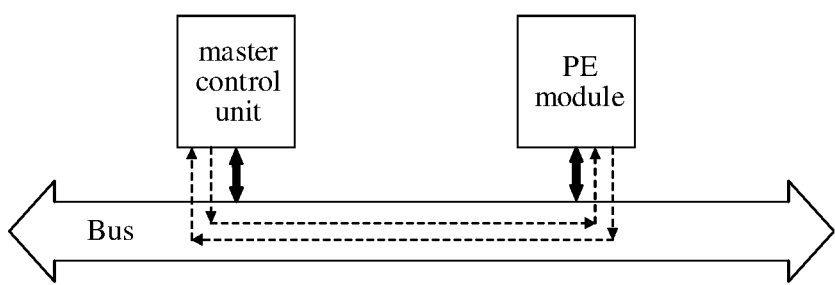
FIG. 4 is a schematic diagram of a computing architecture relying on control flow.

One of the two computing architectures is a master-slave structure with an integrated on-chip master control unit and a memristor processing unit. In this structure, data dispatch and control are initiated and completed by the master control unit, this architecture supports compiling various neural networks and machine learning algorithms into operators supported by the memristor processing unit and has good versatility and flexibility. However, this architecture requires frequent data communication between the control unit and the memristor processing unit to complete the task, resulting in a lot of system latency and power consumption overhead, and low computational efficiency. FIG. 4 shows a computing architecture based on control flow, the computing architecture includes a master control unit and several memristor processing modules (referred to as PE modules). For example, the specific implementation of the master control unit is not unique, but it may be based on ARM architecture or RSIC-V architecture, etc. The PE module includes several memristor processing units, as well as some necessary control units and other functional modules, such as storage, cache unit, input-output interface, memory access control unit, and routing communication module, etc. In this computing architecture, the PE module provides fine-grained acceleration of the basic operators; after completing the configuration of parameters such as basic weights, the complete execution of the algorithm depends on the scheduling of the master control unit, the master control unit continuously allocates computing tasks to the PE modules for parallel accelerated computing, and data is transmitted back and forth between the PE modules and the master control unit to finally complete the overall task. This computing architecture has good flexibility and may widely support a variety of artificial intelligence algorithms with the cooperation of the top-level software development toolchain to better adapt to the development of algorithms. However, scheduling and data interaction takes a lot of time and power consumption, and the computational efficiency is not high.

Figure 5A:
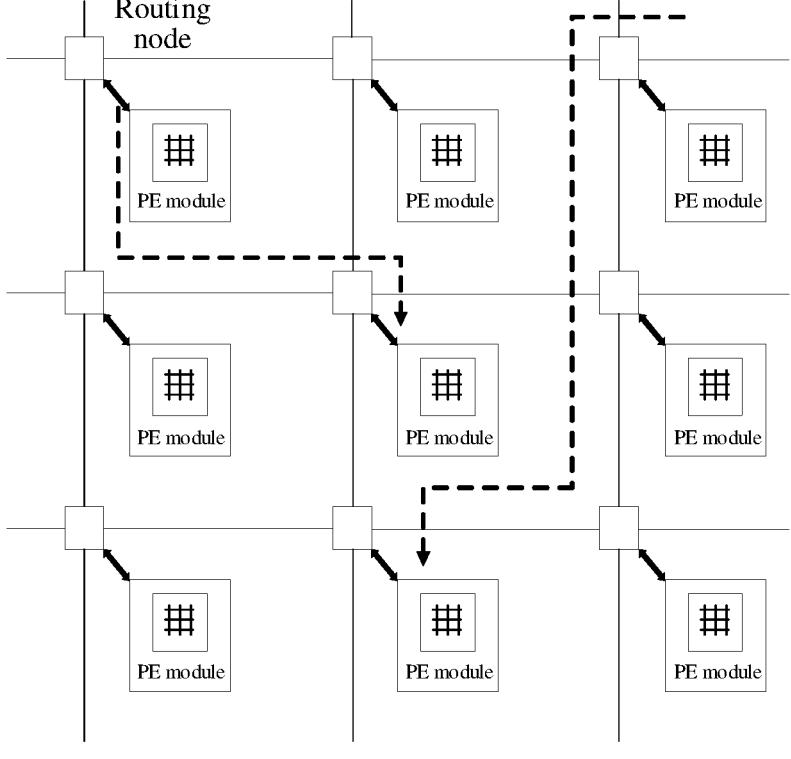
FIG. 5A is a schematic diagram of computing architecture based on a data flow of communication between memristor processing modules.
Figure 5B:
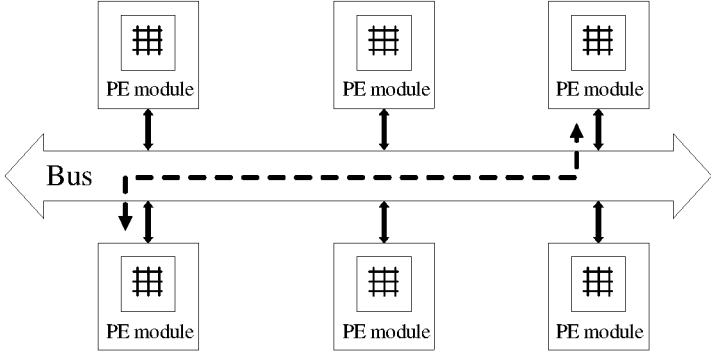
FIG. 5B is a schematic diagram of another computing architecture based on a data flow of communication between memristor processing modules.

Another architecture is a specialized processor design for a specific algorithm, such as a convolutional network accelerator. In this implementation, deep optimization and design are usually carried out for the target algorithm. Each integrated memristor processing unit communicates with each other according to the configuration. This architecture eliminates the need for the scheduling of the master control unit, which is an efficient in-memory computing implementation. However, this is a coarse-grained accelerator architecture, and the deeply customized flow design restricts its adaptation and support for other algorithms, lacks flexible control and scheduling to meet the application requirements of multi-target, multi-scenario, and multi-task, and lacks flexibility and versatility. FIG. 5A and FIG. 5B illustrate two computing architectures based on a data flow of communication between memristor processing modules. For the computing architectures shown in FIG. 5A and FIG. 5B, after completing the system configuration, the overall computing process no longer needs or rarely needs the master control unit to complete the control and dispatch, and point-to-point free communication between each PE module may be achieved. The realization of the task mainly depends on the data interaction between the modules according to the configuration, which may eliminate the frequent communication between the master control unit and the PE modules in the computing architecture shown in FIG. 4. This computing architecture may achieve coarse-grained algorithm-level parallel acceleration through an appropriate pipeline design, save a large amount of waiting time, and the system will complete specific algorithms more quickly and efficiently. However, with limited on-chip resources, all machine learning algorithms may not be deployed, and often only a specific number of algorithm models may be supported, thus limiting flexibility and versatility. As above, the PE module includes a plurality of memristor processing units, and each memristor processing unit may interact and cooperate with each other. The communication between PE modules is implemented in various ways. For example, the communication may be implemented based on the on-chip routing (including several routing nodes) mechanism as shown in FIG. 5A, and specifically, the communication may be a switch array or a network-on-chip, etc. For example, the communication may also be implemented based on the bus (e.g. AXI bus, etc.) mechanism to achieve point-to-point communication between PE modules. Each PE module may be either a master control unit or a slave unit, and different PE modules have different interface addresses.

At least some embodiments of the present disclosure provide an in-memory computing processor, the in-memory computing processor comprises a first master control unit and a plurality of memristor processing modules. The first master control unit is configured to be capable of dispatching and controlling the plurality of memristor processing modules, the plurality of memristor processing modules are configured to be capable of calculating under the dispatch and control of the first master control unit, and the plurality of memristor processing modules are further configured to be capable of communicating independently of the first master control unit to calculate (that is, the plurality of memristor processing modules are further configured to be capable of communicating without relying on the first master control unit to calculate).

At least some embodiments of the present disclosure also provide an in-memory computing processing system corresponding to the above in-memory computing processor and a deployment method of an algorithm model.

The memristor processing module in the in-memory computing processor provided in the embodiments of the present disclosure is capable of performing calculation under the dispatch and control of the first master control unit, and may also communicate independently of the first master control unit to calculate. Therefore, the in-memory computing processor has a hybrid dispatch structure that integrates control flow and data flow, and supports both fine-grained operator-level acceleration and coarse-grained algorithm-level acceleration, thus meeting the flexibility and versatility and having high computational efficiency.

Some embodiments of the present disclosure and examples thereof are described in detail below with reference to the accompanying drawings.

Figure 6:
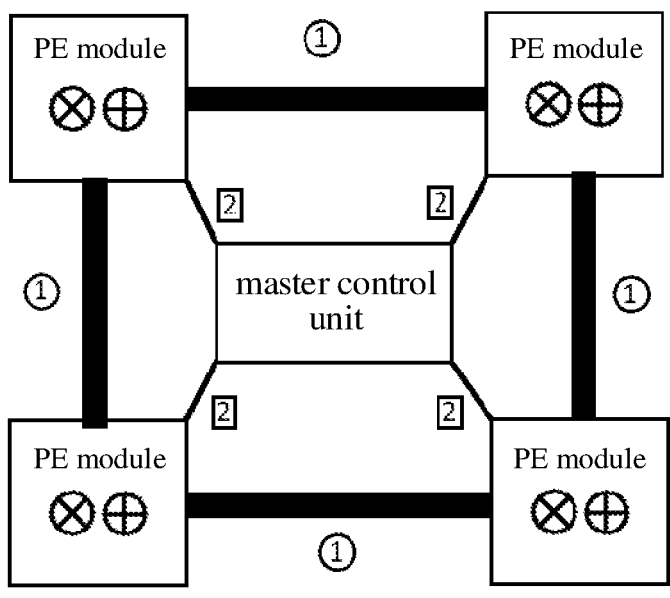
FIG. 6 is a schematic diagram of a hybrid dispatch architecture of an in-memory computing processor provided by some embodiments of the present disclosure.

At least some embodiments of the present disclosure provide an in-memory computing processor with a hybrid dispatch architecture. FIG. 6 is a schematic diagram of a hybrid dispatch architecture of an in-memory computing processor according to some embodiments of the present disclosure.

As shown in FIG. 6, the in-memory computing processor includes a first master control unit (i.e., the "master control unit" shown in FIG. 6) and a plurality of memristor processing modules (i.e., the PE modules shown in FIG. 6). For example, the first master control unit is configured to be capable of dispatching and controlling the plurality of PE modules, the plurality of PE modules are configured to be capable of performing calculation under the dispatch and control of the first master control unit, and the plurality of memristor processing modules are also configured to be capable of communicating independently of the first master control unit to calculate, that is, the communication hardly needs the participation of the first master control unit.

Figure 7A:
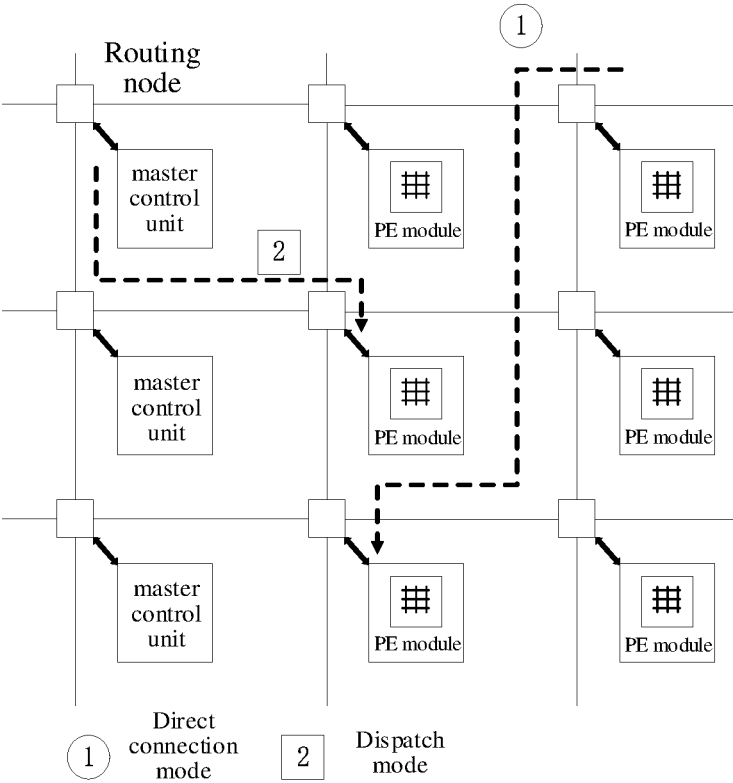
FIG. 7A is a schematic diagram of a hybrid dispatch architecture based on an on-chip routing mechanism provided by some embodiments of the present disclosure.
Figure 7B:
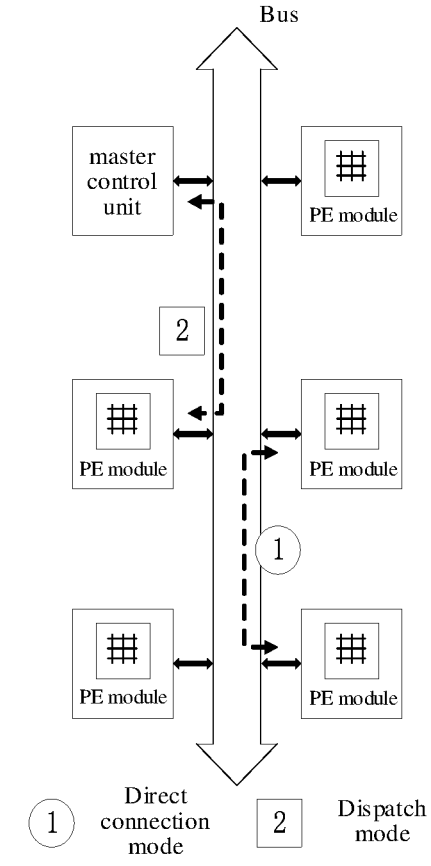
FIG. 7B is a schematic diagram of a hybrid dispatch architecture based on a bus mechanism provided by some embodiments of the present disclosure.

Therefore, the hybrid dispatch architecture shown in FIG. 6 supports two data interaction modes at the same time. One of the two data interaction modes is a dispatch mode in which the first master control unit completes the dispatch and control, and the PE module completes the operator acceleration. This data interaction mode is a highly flexible computing processing oriented to control flow. The other one of the two data interaction modes is a deeply customized direct connection mode that realizes data interaction and scheduling according to the configuration between PE modules and hardly requires the participation of the first master control unit. This data interaction mode is a data flow-based acceleration process, which may avoid the overhead of interacting with the first master control unit and achieve more efficient parallel flow computing. It should be noted that the embodiments of the present disclosure do not limit the specific implementation of these two modes. FIG. 7A shows a hybrid dispatch architecture based on an on-chip routing mechanism, and FIG. 7B shows a schematic diagram of a hybrid dispatch architecture based on a bus mechanism. For example, the direct-connection mode may use the on-chip routing mechanism as shown in FIG. 7A or the bus mechanism as shown in FIG. 7B, etc., that is, the PE modules may communicate with each other via the bus or the on-chip routing. For example, the dispatch mode for the interaction between the first master control unit and the PE modules may also use the on-chip routing mechanism as shown in FIG. 7A or the bus mechanism as shown in FIG. 7B, etc., that is to say, the first master control unit may interact with the PE modules through the bus or the on-chip routing.

For example, the embodiments of the present disclosure do not limit the specific implementation of the first master control unit, which may be based on the ARM architecture or the RSIC-V architecture, etc. For example, each PE module includes a plurality of memristor processing units (e.g., the memristor processing unit shown in FIG. 3, but not limited thereto). For example, in order to adapt to the hybrid dispatch architecture described above (a hybrid dispatch architecture at the processor level), each PE module has an independent interface address. For example, the embodiments of the present disclosure do not limit the interaction mechanism between the memristor processing units in each PE module.

Figure 8A:
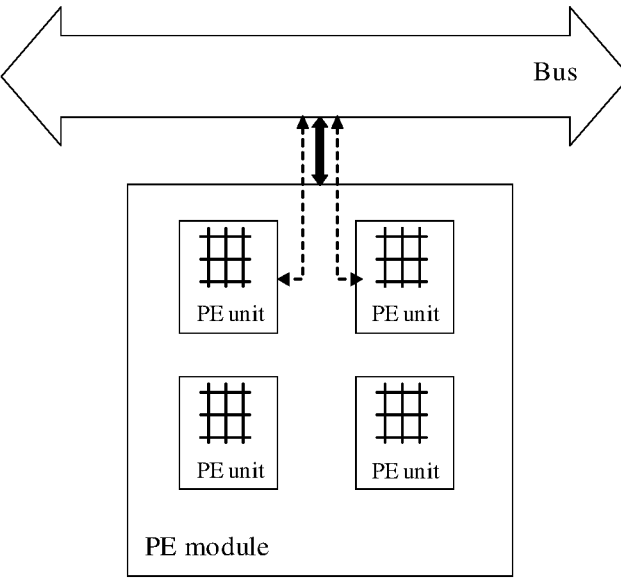
FIG. 8A is a schematic diagram of an interaction mechanism between memristor processing units in a memristor processing module provided by some embodiments of the present disclosure.
Figure 8B:
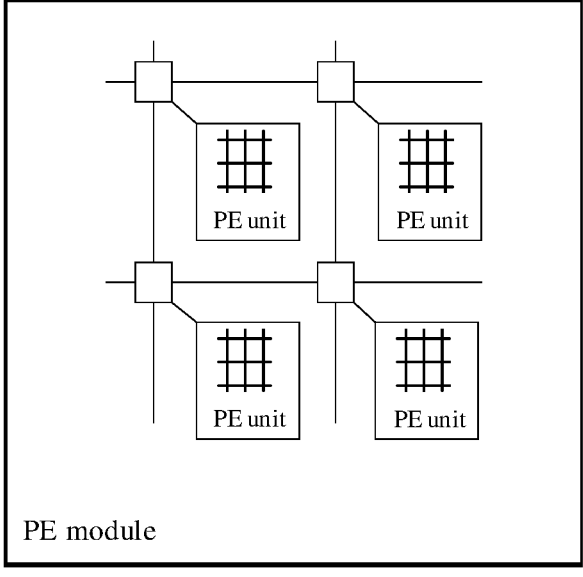
FIG. 8B is a schematic diagram of another interaction mechanism between memristor processing units within a memristor processing module provided by some embodiments of the present disclosure.

FIG. 8A shows a bus-based interaction mechanism between the memristor processing units inside the PE module and FIG. 8B shows an on-chip routing-based interaction mechanism between the memristor processing units inside the PE module. As shown in FIG. 8A and FIG. 8B, each PE module integrates a plurality of memristor processing units, and these memristor processing units may also interact with each other via the bus or the on-chip routing. For example, in practical applications, a PE module may deploy one layer or multi-layers of the network. When deploying a layer of network, each memristor processing unit cooperates to complete the acceleration computation of this layer; when deploying a multi-layer network, each memristor processing unit is required to perform data interaction to achieve acceleration of different layers.

It should be understood that, similar to the hybrid dispatch architecture at the processor level shown in FIG. 6, each PE module may also have a hybrid dispatch architecture. For example, in some embodiments, the first master control unit is also configured to be capable of dispatching and controlling the plurality of memristor processing units; the plurality of memristor processing units in each PE module are configured to be capable of calculating under the dispatch and control of the first master control unit; the plurality of memristor processing units in each PE module are also configured to directly perform data communication (independent of the first master control unit) to calculate. For example, in other embodiments, each memristor processing module includes not only a plurality of memristor processing units, but also a second master control unit; the second master control unit is configured to be capable of dispatching and controlling the plurality of memristor processing units; the plurality of memristor processing units are configured to be capable of calculating under the dispatch and control of the second master control unit; the plurality of memristor processing units are also configured to directly perform data communication (independent of the second master control unit) to calculate. For example, the second master control unit may be implemented in a manner that refers to the specific implementation of the first master control unit described above, and no details will be repeated herein. For example, the second master control unit and the first master control unit may be the same master control unit. For example, in order to adapt to the above-mentioned hybrid dispatch architecture (hybrid dispatch architecture at PE module level), each memristor processing unit has an independent interface address.

Similar to the hybrid dispatch architecture at the processor level shown in FIG. 6, the above hybrid dispatch architecture at the PE module level may also support two data interaction modes at the same time, the details of the two data interaction modes may be found in the above-mentioned descriptions of the direct connection mode and the dispatch mode (as long as the memristor processing unit is considered as a PE module), and no details will be repeated here.

Figure 9:
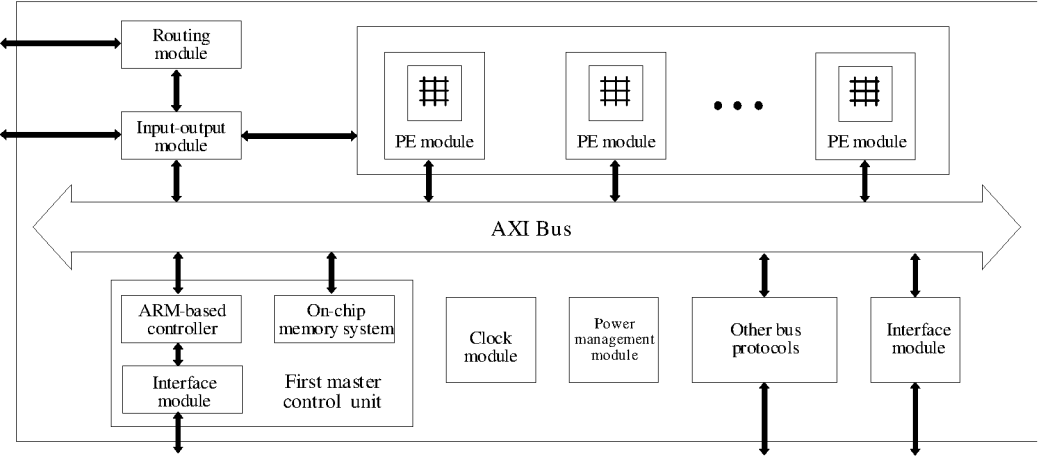
FIG. 9 is a schematic block diagram of an in-memory computing processor based on a hybrid dispatch architecture provided by some embodiments of the present disclosure.

FIG. 9 is a schematic block diagram of an in-memory computing processor based on a hybrid dispatch architecture provided by some embodiments of the present disclosure. As shown in FIG. 9, in addition to the master control unit and PE modules, the in-memory computing processor may also include a routing module, an input-output module, a clock module, a power management module, an interface module, and so on. For example, the routing module is used for interconnection and data communication between processors and using a customized routing protocol for the interaction. The clock module is used to generate the clock signal of the processor. The power management module is used to generate and manage the power supply required by the processor. The interface module may include one or more PCIE (peripheral component interconnect express) interfaces, SPI (Serial Peripheral Interface) interfaces, I2C (Inter-Integrated Circuit) interfaces, DDR (Double Data Rate) interfaces, UART (Universal Asynchronous Receiver/Transmitter) interfaces, etc., to connect to hardware modules other than the processor to extend the capabilities of the processor.

Figure 10:
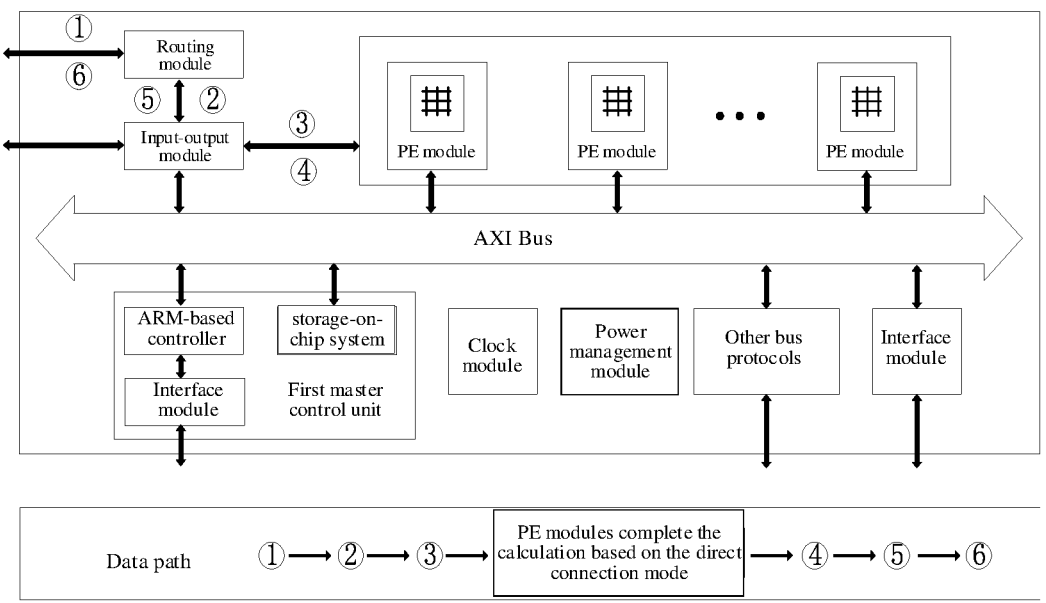
FIG. 10 is the direct-connected mode data path within the in-memory computing processing shown in FIG. 9.

For example, the in-memory computing processor is configured to support a first computing mode (the direct connection mode). For example, in the first computing mode (direct connection mode), the routing module is configured to receive input data, parse the input data to obtain an input signal (i.e., the parsed input data), and transmit the input signal to the input-output module; the input-output module is configured to distribute the input signal and transmit the input signal to at least one memristor processing module of the plurality of memristor processing modules; the at least one memristor processing module is configured to perform calculation based on the input signal to obtain an output signal; the input-output module is further configured to receive the output signal from the at least one memristor processing module, collate the output signal to obtain the output data, and transmit the output data to the routing module; the routing module is also configured to output the output data. FIG. 10 is a data path in the direct connection mode within the in-memory computing processing shown in FIG. 9. For example, as shown in FIG. 10, in the first computing mode (the direct connection mode), the input data enters the routing module through path 1, and the routing module performs a parse operation (e.g., such as the address matching operation and the like) on the input data and transmits the input signal obtained by the parse operation to the input-output module through the path 2; the input-output module redistributes the input signal as configured and transmits the input signal to at least one PE module (e.g., PE module group) through the path 3 (path 3 may also be in the form of AXI bus), and the at least one PE module completes the calculation based on the direct connection mode, and returns the processed output signal to the input-output module through the path 4 (path 4 may also be in the form of AXI bus); the input-output module collate the output signal to obtain the output data and transmits the output data to the routing module through the path 5; the routing module then outputs the output data to the outside through the path 6. In the first computing mode (direct connection mode), each PE module may interact with each other through, for example, the AXI bus according to the configured flow and interaction mode, without the participation of the first master control unit, thus realizing efficient computing.

Figure 11:
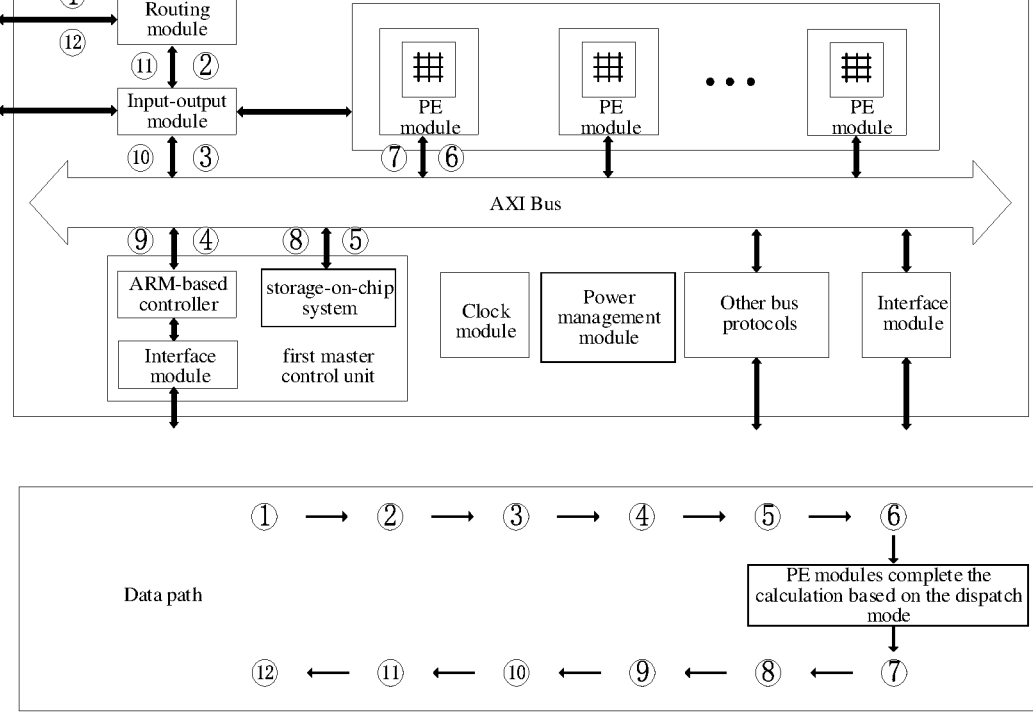
FIG. 11 is the dispatch mode data path within the in-memory computing processing shown in FIG. 9.

For example, the in-memory computing processor is further configured to support a second computing mode (dispatch mode). For example, in the second computing mode (dispatch mode), the routing module is configured to receive the input data, parse the input data to obtain the input signal, and transmit the input signal to the input-output module; the input-output module is configured to distribute and transmit the input signal to the first master control unit; the first master control unit is configured to store the input signal, and control at least one memristor processing module of the plurality of memristor processing modules to obtain the input signal and calculate; the at least one memristor processing module is configured to, under the control of the first master control unit, obtain the input signal and calculate based on the input signal to obtain the output signal; the first master control unit is also configured to store the output signal and transmit the output signal to the input-output module; the input-output module is also configured to receive the output signal, collate the output signal to obtain output data, and transmit the output data to the routing module; the routing module is also configured to output the output data. FIG. 11 is the data path in the dispatch mode within the in-memory computing processing shown in FIG. 9. As shown in FIG. 11, in the second computing mode (dispatch mode), the input data enters the routing module through the path 1, and the routing module performs parse operation (e.g., such as the address matching operation and the like) on the input data to obtain input signal, and transmits the input signal to the input-output module through the path 2; the input-output module redistributes the input signal according to the configuration and transmits the input signal to the first master control unit through the path 3 and path 4 (path 3 may also be AXI bus); the first master control unit stores the input signal into, for example, a storage-on-chip system under the control of an ARM-based controller (or an RSIC-V-based controller, etc.), and generates configuration data for the computing mode of the PE module; the first master control unit controls the PE module to obtain the input signal through the path 5 and path 6, and performs the corresponding calculation processing under the control of the first master control unit; the output signal obtained by the calculation processing is stored in the storage-on-chip system of the first master control unit through the path 7 and path 8, and then the output signal is returned to the input-output module through the path 9 and path 10 under the control of an ARM-based controller (or an RSIC-V-based controller, etc.); the input-output module collate the output signal to obtain the output data and transmits the output data to the routing module through the path 11; the routing module then outputs the output data through the path 12. In the second computing mode (dispatch mode), the first master control unit may interact with each PE module through, for example, the AXI bus according to the configuration, so as to satisfy the flexibility of computing.

The first computing mode (direct connection mode) has high speed and low power consumption, and can complete coarse-grained operator or algorithm-level acceleration; the second computing mode (dispatch mode) has slow-speed, high power consumption, and can complete fine-grained operator acceleration, and is more flexible; with the cooperation of the main control unit, the second computing mode can realize more operators and operations and support more algorithm acceleration.

It should be understood that the in-memory computing processor may also be configured to support a third computing mode (hybrid mode), that is, support both the first computing mode (direct connection mode) and the second computing mode (dispatch mode) at the same time. For example, in the third computing mode (hybrid mode), the routing module is configured to receive input data, parse the input data to obtain an input signal, and transmit the input signal to the input-output module; the input-output module is configured to distribute the input signal, and transmit a first part of the input signal to a first part of the memristor processing modules among the plurality of memristor processing modules (the first part of the memristor processing modules includes at least one memristor processing module), and transmit the second part of the input signal to the first master control unit; the first part of the memristor processing modules is configured to calculate based on the first part of the input signal to obtain the first output signal; the first master control unit is configured to store the second part of the input signal, and to control the second part of the memristor processing modules (the second part of the memristor processing modules includes at least one memristor processing module) among the plurality of memristor processing modules to obtain the second part of the input signal and calculate; the second part of the memristor processing modules is configured to, under the control of the first master control unit, obtain the second part of the input signal and calculate based on the second part of the input signal to obtain a second output signal; the first master control unit is further configured to store the second output signal, and transmit the second output signal to the input-output module; the input-output module is further configured to receive the first output signal and the second output signal, and correspondingly collate the first output signal and the second output signal to obtain the first output data and the second output data. In other words, the first part of the PE modules in the in-memory computing processor may complete the calculation based on the above-mentioned direct connection mode, and the second part of the PE modules may complete the calculation based on the above-mentioned dispatch mode, and the specific details may be referred to the above-mentioned description of the direct connection mode and dispatch mode, which will not be repeated here.

Figure 12:
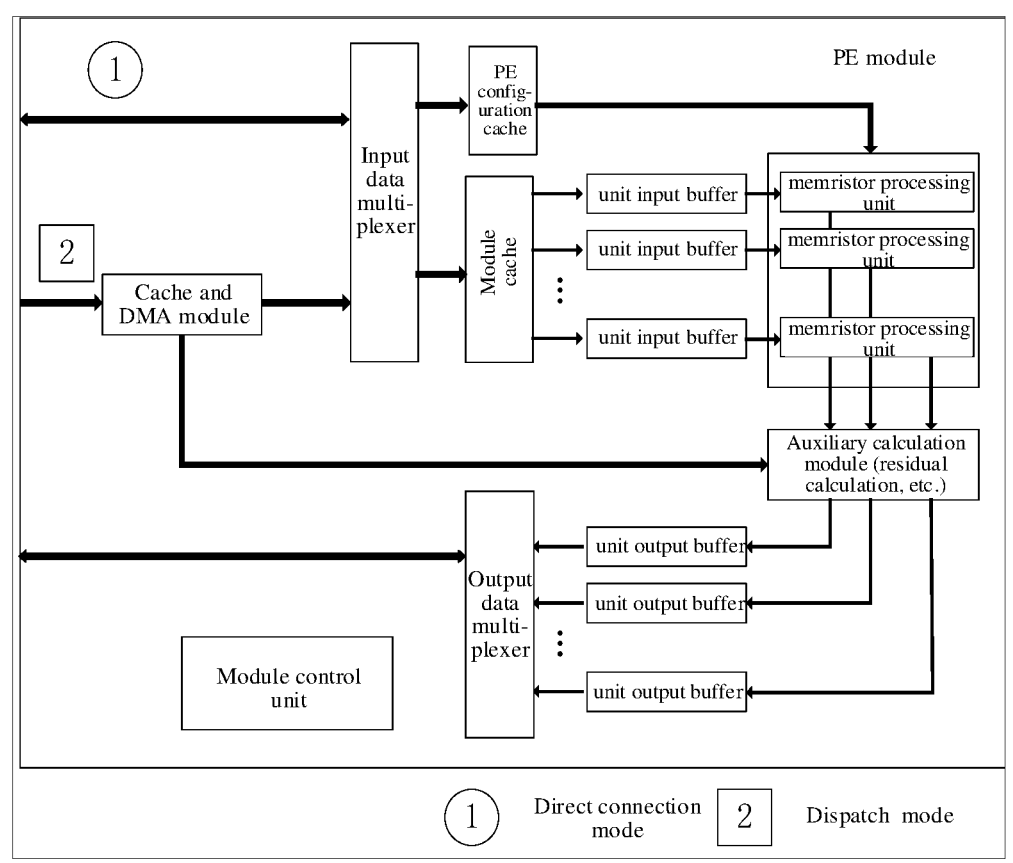
FIG. 12 is a schematic block diagram of a memristor processing module provided by some embodiments of the present disclosure.

FIG. 12 is a schematic block diagram of a memristor processing module provided by some embodiments of the present disclosure. As shown in FIG. 12, the PE module further includes a module control unit, a cache, a DMA (Direct Memory Access) module, an input data multiplexer, a PE configuration buffer, a module cache, a unit input buffer, an auxiliary computing module, a unit output buffer, and an output data multiplexer, etc. The module control unit is used to manage and control the operating status and mode of the entire PE module; the cache and DMA module is used to store input data and to control the data scheduling within the PE module in the dispatch mode; the input data multiplexer is used to select whether to send the data of path 1 or the data of path 2 to the subsequent stage; the PE configuration buffer is used to store configuration information relating to the control; the module cache is used to store input information of each memristor processing unit; the unit input buffer is used to store specific input data of the corresponding memristor processing unit; the auxiliary calculation module is used to complete additional digital processing functions, including residual calculation, data splicing, etc., to process the output of each memristor processing unit; the unit output buffer is used to store output data of each memristor processing unit after passing through the auxiliary computing module; the output data multiplexer is used to select which unit output buffer outputs the data.

As shown in FIG. 12, when the PE module is in the direct connection mode, the data may be processed in the manner 1 in FIG. 12 (i.e., ① in FIG. 12). In the direct connection mode, the input data (e.g., output data of other PE modules) enters the input data multiplexer through the path 1 and is input to the PE configuration buffer and the module cache to further configure the unit input buffer, the memristor processing unit completes the calculation with the cooperation of the module control unit, the calculation result is input to the auxiliary calculation module and processed as configured, the processed data is stored in the unit output cache and output to the next stage PE module through the output data multiplexer. As shown in FIG. 12, when the PE module is in the dispatch mode, the data may be processed in the manner 2 in FIG. 12 (i.e., ② in FIG. 12). In the dispatch mode, the input data is controlled by the module control unit and enters the cache and DMA module first through the path 2. And then, according to system configuration, the input data may be sent to the input data multiplexer in a similar manner to the direct connection mode and complete the subsequent processes, and finally, the processed data may be sent to the module control unit. On the basis of this working manner, the input data may also be directly transmitted to the auxiliary calculation module, under the control of the module control unit, the auxiliary computing module processes the input data and the output data of the memristor processing unit to realize functions such as residual connection, and finally the processed data may be output to the module control unit through the output multiplexer.

For example, in some embodiments, the module control unit in FIG. 12 is the above-mentioned first master control unit or second master control unit.

The memristor processing module in the in-memory computing processor provided in the embodiment of the present disclosure is capable of performing computation under the dispatch and control of the first master control unit, and also capable of communicating independently of the first master control unit for calculating. Therefore, the in-memory computing processor has a hybrid dispatch structure that integrates control flow and data flow, so that the in-memory computing processor supports both fine-grained operator-level acceleration and coarse-grained algorithm-level acceleration, thus meeting the flexibility and versatility and having high computational efficiency.

Figure 13:
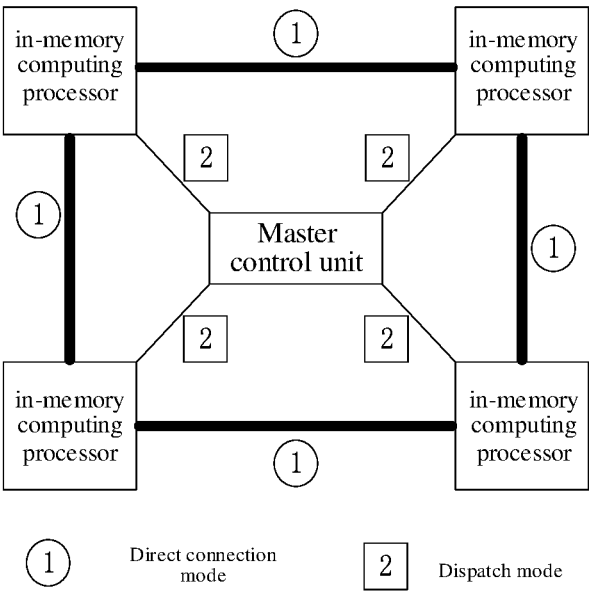
FIG. 13 is a schematic diagram of a hybrid dispatch architecture of an in-memory computing processing system provided by some embodiments of the present disclosure.

At least some embodiments of the present disclosure further provide an in-memory computing processing system that also has a hybrid dispatch architecture. FIG. 13 is a schematic diagram of a hybrid dispatch architecture of an in-memory computing processing system provided by some embodiments of the present disclosure.

As shown in FIG. 13, the in-memory computing processing system includes a third master control unit (i.e., the "master control unit" shown in FIG. 13) and a plurality of in-memory computing processors. For example, the in-memory computing processor is the in-memory computing processor provided by any of the above embodiments of the present disclosure. For example, the third master control unit is configured to dispatch and control the plurality of in-memory computing processors, the plurality of in-memory computing processors are configured to calculate under the dispatch and control of the third master control unit, and the plurality of in-memory computing processors are also configured to communicate independently of the third master control unit for calculating, that is, the communication hardly needs the participation of the third master control unit.

Therefore, similar to the hybrid dispatch architecture at the processor level shown in FIG. 6, the hybrid dispatch architecture at the system level shown in FIG. 13 may also support two data interaction modes at the same time, and also support three computing modes (referring to the above-mentioned first computing mode, the second computing mode and the third computing mode). The details may be found in the above-mentioned descriptions of the direct connection mode and the dispatch mode (as long as the in-memory computing processor is considered as a PE module), no details will be repeated here.

The technical effects of the in-memory computing processing system provided by the embodiments of the present disclosure may be referred to the corresponding description of the in-memory computing processor in the preceding embodiments and will not be repeated here.

At least some embodiments of the present disclosure also provide a deployment method of the algorithm model based on the above-mentioned in-memory computing processor. FIG. 14 is a schematic flowchart of the deployment method of the algorithm model provided by some embodiments of the present disclosure. As shown in FIG. 14, the deployment method of the algorithm model includes the following steps (1)-(5).

(1) Modeling a task. Abstractly modeling a problem for specific intelligent computing scenario and task.

(2) determining an algorithm framework. For the established task model, selecting a suitable algorithm model and framework to determine the algorithm structure.

(3) training parameter. Training the parameters in the algorithm model, and this training process may introduce noise, fluctuation and parasitic effect in the device, array and circuit.

(4) After obtaining the specific algorithm model (the framework and parameters have been determined), obtaining the optimal hardware deployment scheme and the specific configuration parameters by the optimization of the compiler.

(5) Hardware deployment. According to the characteristic of the algorithm model, in the in-memory computing processor with a hybrid dispatch architecture, deploying the algorithm model in any one mode selected from a group consisting of a full direct connection mode, a full dispatch mode and a hybrid dispatch mode. That is, the algorithm model is mapped to a general-purpose in-memory computing processor with a hybrid dispatch architecture. At this time, according to the support degree of algorithm, the full direct connection mode may be used for acceleration, the full dispatch mode may also be used for acceleration, and the partial direct connection and partial dispatch method (i.e., the hybrid dispatch mode) may be used. For example, the specific details of the full direct connection mode, the full dispatch mode and the hybrid dispatch mode may be found in the relevant descriptions of the first computing mode, the second computing mode, and the third computing mode, respectively, which will not be repeated here. For example, in some embodiments, each PE module in the in-memory computing processor may deploy the algorithm model in one of the three modes: the full direct connection mode, the full dispatch mode and the hybrid dispatch mode; for example, in the full direct connection mode, the plurality of memristor processing modules used to implement the algorithm model communicate independently of the first master control unit to calculate; in the full dispatch mode, the plurality of memristor processing modules used to implement the algorithm model perform calculation under the dispatch and control of the first master control unit; in the hybrid dispatch mode, a part of the plurality of memristor processing modules (including at least one memristor processing module) among the plurality of memristor processing modules for implementing the algorithm model communicates independently of the first master control unit to calculate, and another part of the memristor processing modules (including at least one memristor processing module) among the plurality of memristor processing modules for implementing the algorithm model performs calculation under the dispatch and control of the first master control unit. For example, in some other embodiments, each of the memristor processing units in the PE module in the in-memory computing processor may also deploy the algorithm model using one of three modes: the full direct connection mode, the full dispatch mode, and the hybrid dispatch mode; for example, in the full direct connection mode, the plurality of memristor processing units used to implement the algorithm model communicate independently of the first master control unit (or the second master control unit) to calculate; in the full dispatch mode, the plurality of memristor processing units for implementing the algorithm model perform calculation under the dispatch and control of the first master control unit (or the second master control unit); in the hybrid dispatch mode, a part of the plurality of memristor processing units (including at least one memristor processing unit) among the plurality of memristor processing modules for implementing the algorithm model communicates independently of the first master control unit (or the second master control unit) to calculate, and another part of the memristor processing modules (including at least one memristor processing module) among the plurality of memristor processing modules for implementing the algorithm model performs calculation under the dispatch and control of the first master control unit (or the second master control unit).

It should be understood that the embodiments of the present disclosure do not limit the specific implementation of the above steps (1)-(4).

In practical applications, for a complex deep learning network, deploying the part that may be directly connected and accelerated to the direct connection mode for acceleration, deploying the remaining part to the dispatch mode for acceleration, and completing the computing task together through optimized collaborative computing. FIG. 15 is a schematic diagram of a deployment scheme for a residual neural network provided by some embodiments of the present disclosure. For example, as shown in FIG. 15, a Residual Neural Network (ResNet) typically includes a convolutional layer, a residual structure, and a fully connected layer that are connected in sequence. The residual structure may be deployed in the dispatch mode. The remaining directly connected convolutional layer and fully connected layer may be deployed in the direct connection mode, that is, the residual neural network may be deployed in the hybrid dispatch mode. For example, when the residual neural network described in FIG. 15 is deployed within one PE module of the in-memory computing processor, the calculation of the residual structure based on the dispatch mode may be accomplished by, for example, manner 2 shown in FIG. 12, while the calculation of the remaining directly connected convolutional layer and fully connected layer based on the direct connection mode may be accomplished by, for example, manner 1 shown in FIG. 12.

The technical effects of the deployment method of the algorithm model provided by the embodiments of the present disclosure may be referred to the corresponding description of the in-memory computing processor in the above embodiments and will not be repeated here.

At least some embodiments of the present disclosure also provide an in-memory computing processing apparatus. FIG. 16 is a schematic block diagram of the in-memory computing processing apparatus provided by some embodiments of the present disclosure. For example, as shown in FIG. 16, the in-memory computing processing apparatus includes the in-memory computing processor or in-memory computing processing system provided in the above embodiments and an input interface and an output interface connected to the in-memory computing processor or the in-memory computing processing system. For example, the in-memory computing processing apparatus may perform the above-mentioned deployment method of the algorithm model based on the in-memory computing processor therein.

For example, in some examples, as shown in FIG. 16, the in-memory computing processing apparatus may also include a system bus, the in-memory computing processor, the input interface, and the output interface may communicate with each other through the system bus. For example, the input interface is configured to receive instructions from an external computer device, a user, etc., to control the operation of the in-memory computing processor, etc. For example, the output interface is configured to output the operation result of the in-memory computing processor, etc. For example, external devices communicating with the in-memory computing processor via the input interface and output interface may be included in an environment that provides any type of user interface with which a user may interact. Examples of user interface types include a graphical user interface, a natural user interface, etc. For example, the graphical user interface may receive input from a user using an input device such as a keyboard, a mouse, a remote control, etc., and provide output on an output device such as a display. In addition, the natural user interface may enable the user to interact with the in-memory computing processing apparatus in a manner that is not subject to constraints imposed by an input device such as a keyboard, a mouse, a remote control, etc. Relatively, the natural user interface may rely on speech recognition, touch and stylus recognition, gesture recognition on and near the screen, in-air gestures, head and eye tracking, speech and semantics, vision, touch, gestures, and machine intelligence, etc.

In addition, although the in-memory computing processing apparatus is illustrated as a single system in FIG. 16, it is understood that the in-memory computing processing apparatus may also be a distributed system and may also be arranged as a cloud facility (including a public or private cloud). Thus, for example, several devices may communicate via a network connection and may jointly perform the tasks described as being performed by the in-memory computing processing apparatus.

For example, the operation process of the deployment method of the algorithm model may be referred to the relevant description in the above-mentioned embodiment of the deployment method of the algorithm model, and the no details will be repeated here.

It should be noted that the in-memory computing processing apparatus provided by the embodiments of the present disclosure is exemplary rather than limiting. According to practical application requirements, the in-memory computing processing apparatus may also include other conventional components or structures. For example, in order to realize the necessary functions of the in-memory computing processing apparatus, those skilled in the art may set other conventional components or structures according to specific application scenarios, which are not limited in the embodiments of the present disclosure.

The technical effects of the in-memory computing processing apparatus provided by the embodiments of the present disclosure may be referred to the corresponding descriptions of the parallel acceleration method and the in-memory computing processor in the above embodiments, which will not be repeated here.

The following points need to be noted:

(1) In the drawings of the embodiments of the present disclosure, only the structures related to the embodiments of the present disclosure are involved, and other structures may refer to the common design(s).

(2) In case of no conflict, features in one embodiment or in different embodiments of the present disclosure may be combined.

The above are merely particular embodiments of the present disclosure but are not limitative to the scope of the present disclosure; any of those skilled familiar with the related arts may easily conceive variations and substitutions in the technical scopes disclosed by the present disclosure, which should be encompassed in protection scopes of the present disclosure. Therefore, the scopes of the present disclosure should be defined in the appended claims.

What is claimed is:

1. An in-memory computing processor, comprising:
   a first master control unit and a plurality of memristor processing modules,
   wherein the first master control unit is configured to be capable of dispatching and controlling the plurality of memristor processing modules,
   the plurality of memristor processing modules are configured to be capable of calculating under the dispatch and control of the first master control unit, and
   the plurality of memristor processing modules are further configured to be capable of communicating independently of the first master control unit to calculate to implement a computing task together, and
   wherein each of the plurality of memristor processing modules comprises a plurality of memristor processing units, each of the plurality of memristor processing units comprises a memristor array, and the memristor array comprises a plurality of rows and columns of memristors arranged in an array;
   wherein the in-memory computing processor further comprises:
      a routing module and an input-output module,
      the routing module is configured to receive input data, parse the input data to obtain an input signal, and transmit the input signal to the input-output module,
      wherein the in-memory computing processor is configured to support a first computing mode, and in the first computing mode:

the input-output module is configured to distribute and transmit the input signal to at least one memristor processing module of the plurality of memristor processing modules, the at least one memristor processing module is configured to calculate according to the input signal to obtain a first output signal, the input-output module is further configured to receive and collate the first output signal from the at least one memristor processing module to obtain first output data, and the routing module is further configured to output the first output data.

2. The in-memory computing processor according to claim 1, wherein the first master control unit is further configured to be capable of dispatching and controlling the plurality of memristor processing units, the plurality of memristor processing units are configured to be capable of calculating under the dispatch and control of the first master control unit, and the plurality of memristor processing units are further configured to directly perform data communication to calculate.

3. The in-memory computing processor according to claim 1, wherein each of the plurality of memristor processing modules further comprises a second master control unit, wherein the second master control unit is configured to be capable of dispatching and controlling the plurality of memristor processing units, the plurality of memristor processing units are configured to be capable of calculating under the dispatch and control of the second master control unit, and the plurality of memristor processing units are further configured to directly perform data communication to calculate.

4. The in-memory computing processor according to claim 2, wherein each of the plurality of memristor processing units has an independent interface address.

5. The in-memory computing processor according to claim 1, wherein the plurality of memristor processing modules communicate with each other via a bus or a routing-on-chip.

6. The in-memory computing processor according to claim 1, wherein the first master control unit interacts with the plurality of memristor processing modules via a bus or an on-chip routing.

7. The in-memory computing processor according to claim 1, wherein each of the plurality of memristor processing modules has an independent interface address.

8. The in-memory computing processor according to claim 1, wherein the in-memory computing processor is further configured to support a second computing mode, and in the second computing mode:

the input-output module is configured to distribute and transmit the input signal to the first master control unit, the first master control unit is configured to store the input signal, and control at least one memristor processing module of the plurality of memristor processing modules to obtain the input signal for calculating, the at least one memristor processing module is configured to, under the control of the first master control unit, obtain the input signal and calculate according to the input signal to obtain a second output signal, the first master control unit is further configured to store the second output signal and transmit the second output signal to the input-output module, the input-output module is further configured to receive and collate the second output signal to obtain second output data, the routing module is further configured to output the second output data.

9. The in-memory computing processor according to claim 1, wherein the in-memory computing processor is further configured to support a third computing mode, in the third computing mode:

the input-output module is configured to distribute the input signal, transmit a first part of the input signal to a first part of the memristor processing modules among the plurality of memristor processing modules, and transmit a second part of the input signal to the first master control unit, the first part of the memristor processing modules is configured to calculate based on the first part of the input signal to obtain a third output signal, the first master control unit is configured to store the second part of the input signal, control a second part of the memristor processing modules among the plurality of memristor processing modules to obtain the second part of the input signal for calculating, the second part of the memristor processing modules is configured to, under the control of the first master control unit, obtain the second part of the input signal and calculate based on the second part of the input signal to obtain a fourth output signal, the first master control unit is further configured to store the fourth output signal, and transmit the fourth output signal to the input-output module, the input-output module is further configured to receive the third output signal and the fourth output signal, and correspondingly collate the third output signal and the fourth output signal to obtain third output data and fourth output data, the routing module is further configured to output the third output data and the fourth output data.

10. A deployment method of an algorithm model based on the in-memory computing processor according to claim 1, comprising:

according to a characteristic of the algorithm model, in the in-memory computing processor, deploying the algorithm model in any one mode selected from a group consisting of a full direct connection mode, a full dispatching mode and a hybrid dispatch mode;

wherein in the full direct connection mode, the plurality of memristor processing modules for implementing the algorithm model communicate independently of the first master control unit to calculate, in the full dispatch mode, the plurality of memristor processing modules for implementing the algorithm model perform calculation under the dispatch and control of the first master control unit, and in the hybrid dispatch mode, a part of the memristor processing modules among the plurality of memristor processing modules for implementing the algorithm model communicates independently of the first master control unit to calculate, and another part of the memristor processing modules among the plurality of memristor processing modules for implementing the algorithm model performs calculation under the dispatch and control of the first master control unit.

11. The in-memory computing processor according to claim 3, wherein each of the plurality of memristor processing units has an independent interface address.

12. The in-memory computing processor according to claim 3, wherein the plurality of memristor processing modules communicate with each other via a bus or a routing-on-chip.

13. The in-memory computing processor according to claim 3, wherein the first master control unit interacts with the plurality of memristor processing modules via a bus or an on-chip routing.

14. The in-memory computing processor according to claim 3, wherein each of the plurality of memristor processing modules has an independent interface address.

15. An in-memory computing processing system, comprising a third master control unit and a plurality of in-memory computing processors, each of the plurality of in-memory computing processors comprises a first master control unit and a plurality of memristor processing modules, wherein the first master control unit is configured to be capable of dispatching and controlling the plurality of memristor processing modules, the plurality of memristor processing modules are configured to be capable of calculating under the dispatch and control of the first master control unit, and the plurality of memristor processing modules are further configured to be capable of communicating independently of the first master control unit to calculate to implement a computing task together;

wherein the third master control unit is configured to be capable of dispatching and controlling the plurality of in-memory computing processors;

the plurality of in-memory computing processors are configured to be capable of calculating under the dispatch and control of the third master control unit;

the plurality of in-memory computing processors are further configured to be capable of communicating independently of the third master control unit, and wherein each of the plurality of memristor processing modules comprises a plurality of memristor processing units, each of the plurality of memristor processing units comprises a memristor array, and the memristor array comprises a plurality of rows and columns of memristors arranged in an array;

wherein each in-memory computing processor further comprises:

a routing module and an input-output module, the routing module is configured to receive input data, parse the input data to obtain an input signal, and transmit the input signal to the input-output module, wherein the in-memory computing processor is configured to support a first computing mode, and in the first computing mode:

the input-output module is configured to distribute and transmit the input signal to at least one memristor processing module of the plurality of memristor processing modules, the at least one memristor processing module is configured to calculate according to the input signal to obtain a first output signal, the input-output module is further configured to receive and collate the first output signal from the at least one memristor processing module to obtain first output data, and the routing module is further configured to output the first output data.

16. An in-memory computing processing apparatus, comprising:

an in-memory computing processor, an input interface and an output interface connected to the in-memory computing processor, wherein the in-memory computing processor comprises a first master control unit and a plurality of memristor processing modules, wherein the first master control unit is configured to be capable of dispatching and controlling the plurality of memristor processing modules, the plurality of memristor processing modules are configured to be capable of calculating under the dispatch and control of the first master control unit, and the plurality of memristor processing modules are further configured to be capable of communicating independently of the first master control unit to calculate to implement a computing task together;

wherein the input interface is configured to receive an instruction to control an operation of the in-memory computing processor, the output interface is configured to output an operation result of the in-memory computing processor, and wherein each of the plurality of memristor processing modules comprises a plurality of memristor processing units, each of the plurality of memristor processing units comprises a memristor array, and the memristor array comprises a plurality of rows and columns of memristors arranged in an array;

wherein the in-memory computing processor further comprises:

a routing module and an input-output module, the routing module is configured to receive input data, parse the input data to obtain an input signal, and transmit the input signal to the input-output module, wherein the in-memory computing processor is configured to support a first computing mode, and in the first computing mode:

the input-output module is configured to distribute and transmit the input signal to at least one memristor processing module of the plurality of memristor processing modules, the at least one memristor processing module is configured to calculate according to the input signal to obtain a first output signal, the input-output module is further configured to receive and collate the first output signal from the at least one memristor processing module to obtain first output data, and the routing module is further configured to output the first output data.

* * * * *